United States Patent [19]
Motzet et al.

[11] Patent Number: 5,087,146
[45] Date of Patent: Feb. 11, 1992

[54] ASSEMBLY FOR THE POSITIONING OF TWO STRUCTURAL ELEMENTS IN RELATION TO EACH OTHER

[75] Inventors: Josef Motzet; Harald Sprehe, both of Ingolstadt; Xaver Stemmer, Reichertshofen, all of Fed. Rep. of Germany

[73] Assignee: Audi AG, Ingolstadt, Fed. Rep. of Germany

[21] Appl. No.: 664,314

[22] Filed: Mar. 4, 1991

[30] Foreign Application Priority Data

Mar. 2, 1990 [DE] Fed. Rep. of Germany ....... 4006477

[51] Int. Cl.$^5$ ................................. B25G 3/00
[52] U.S. Cl. ...................... 403/13; 403/383; 403/361
[58] Field of Search ............ 403/121, 13, 14, 383, 403/361, 333

[56] References Cited

U.S. PATENT DOCUMENTS

| 1,950,383 | 3/1934 | Blattner | 403/383 |
| 2,197,140 | 4/1940 | Arvin | 403/383 X |
| 2,815,230 | 12/1957 | Howie | 403/301 X |
| 4,179,771 | 12/1979 | Rankins et al. | 403/361 X |
| 4,344,717 | 8/1982 | Merz | 403/14 |

Primary Examiner—Andrew V. Kundrat
Attorney, Agent, or Firm—Lalos & Keegan

[57] ABSTRACT

An assembly comprising a first structural member having a recess along a longitudinal centerline thereof, the recess having a planar contact surface disposed in spaced relation from the centerline and at least a contact point diametrically opposed to the planar contact surface and a second structural member having a projecting portion along a longitudinal centerline thereof, insertable in the recess to align the members along this longitudinal centerline, the projecting portion having a planar contact surface engageable with the planar contact surface of the first structural member and a contact point engageable with the contact point of the first structural member when the projecting member is received within the recess whereby upon insertion of the projection portions into the recess the members will be prevented from displacing angularly relative to each other abut the aligned centerlines.

10 Claims, 1 Drawing Sheet

ASSEMBLY FOR THE POSITIONING OF TWO STRUCTURAL ELEMENTS IN RELATION TO EACH OTHER

BACKGROUND OF THE INVENTION

The present invention relates to a device for the exact positioning of two structural elements in relation to one another.

The present invention is particularly suitable for applications where the movement of a shaft about a longitudinal axis is undesirable, as for instance, when a specific orientation of the shaft relative to a housing is required. Often it is important that the shaft be positioned on the frame with no play. Furthermore, when utilizing automated manufacturing capabilities, it is particularly desirable to provide a simple and reliable means of ensuring the achievement of such orientation.

Accordingly, it is an object of the present invention to provide an improved assembly for the positioning of two elements in relation to one another.

Another object of the present invention is to provide an improved assembly for the positioning of two elements in relation to one another that ensures a connection free of play.

A further object of the present invention is to provide an improved assembly for the positioning of two elements in relation to one another that is simple and reliable when used by automated manufacturing equipment.

BRIEF DESCRIPTION OF THE INVENTION

Other objects and advantages of the present invention will become more apparent to those persons having ordinary skill in the art to which the present invention pertains from the following description taken in conjunction with the accompanying drawings, wherein.

DETAILED DESCRIPTION OF THE PREFERRED EMBODIMENT

Figure 2:
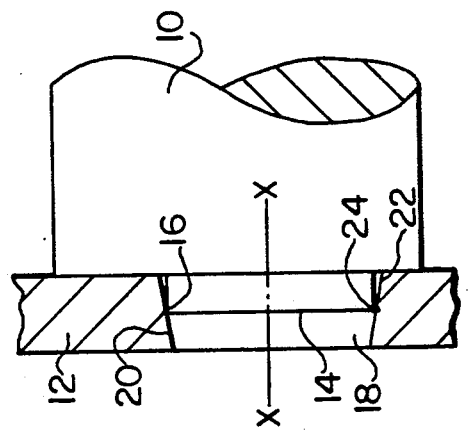
FIG. 2 is a section view of the device taken along Line II—II of FIG. 1.
Figure 1:
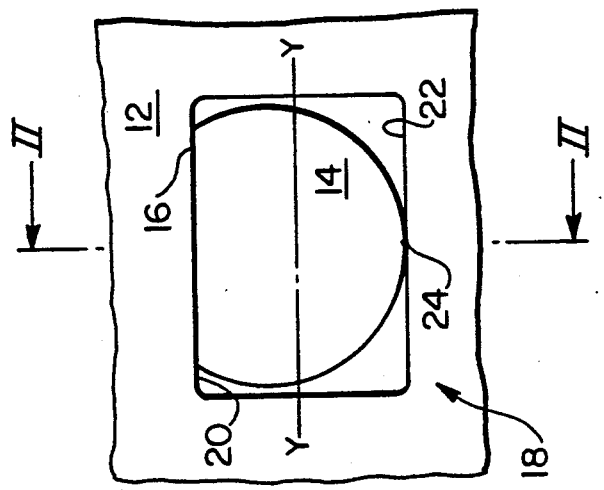
FIG. 1 is an illustration of the present invention for the exact positioning of an adjusting plate in relation to a shaft.

In the assembly shown in FIGS. 1 and 2, two structural members are shown generally as 10 and 12 and are positionable in relation to one another. First structural member 10 is in the form of a shaft, and second structural member 12 is in the form of a plate. Shaft 10 includes a projecting portion 14 generally of a reduced diameter disposed along a longitudinal centerline X—X. Projecting portion 14 includes a planar contact surface 16 on a portion thereof. Contact surface 16 is utilized to assist in achieving the proper orientation of the shaft relative to plate 12.

Plate 12 includes a recess 18 disposed along a longitudinal centerline Y—Y thereof. Recess 18 is polygonal and can be rectangular as shown in FIG. 1. Recess 18 includes a planer contact surface 20 spaced from centerline Y—Y. Recess 18 further includes at least one contact line 24 disposed on a surface 22 which is diametrically opposed to surface 20.

When the centerlines of the projecting portion and plate are aligned relative to each other, projecting portion 14 is easily positioned within recess 18 whereupon two planar contact surfaces 16 and 20 are engageable with each other. This results in shaft 10 being uniquely oriented relative to plate 12, since projecting portion 14 can only be inserted into recess 18 when the planar contact surfaces are aligned. It can thus be seen that the proper orientation of shaft 10 is insured in a simple and expedient manner.

With planar surfaces 16 and 20 so disposed, projecting portion 14 come in contact with recess 18 solely at line 24. This allows very little play in the union of shaft 10 and plate 12, particularly in the angular direction relative to their centerlines.

Recess 18 of plate 12 can be manufactured by punching it out with an appropriate punching device. If so manufactured, the recess will be slightly conical, as seen slightly exaggerated in FIG. 2. If the recess is punched out from the rear toward shaft 10, the recess will be slightly larger on the surface which mounts with shaft 10 than the opposing surface thereof. As a result, planar contact surface 20 of the recess is slightly skewed relative to the shaft planar contact surface 16. Similarly, the surface of the recess near contact line 24 is also disposed at a slight angle relative to the surface of the projecting portion. The line of contact 24 then becomes a point of contact. This point contact is sufficient to keep planar contact surfaces 16 and 20 in contact with one another without play. This configuration might be useful when automated manufacturing capabilities are utilized, because the slight conical surface coupled with the planar contact surfaces will aid in guiding the projection portion into the recess and into the proper alignment.

Additionally, if it is desired that very little play exist in the union of the shaft and plate, the shaft can be dimensioned such that projecting portion 14 is slightly larger than recess 18. Despite the overlap, the additional force that would be required to insert the projecting portion into the recess would be minimal, due to the compression of the material.

Figure 3:
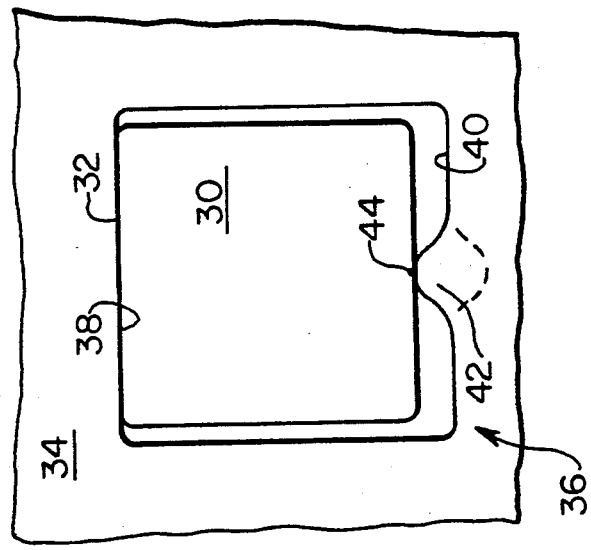
FIG. 3 illustrates an alternative embodiment of the device of the present invention with a square shaft and an adjusting plate with a punched out protuberance.

An alternative embodiment is shown in FIG. 3, wherein a square shaft 30 having a planar contact surface 32 is mounted on a plate 34 having a square recess 36 punched out thereof. A planar contact surface 38 is provided on recess 36, and a surface 40 diametrically opposed to surface 38 is provided having a protuberance 42. A point or line of contact 44 results from the contact of shaft 30 with recess 36. All the advantages of the invention heretofore described in reference to the embodiment of FIG. 1 are realized in this configuration as well.

It is to be appreciated that the present invention is not limited to the examples shown. For example, instead of the rectangular or square recess 18 or 36, a triangular recess or any other polygonal geometry can be selected. In the case of a square shaft as shown in FIG. 3, recess 36 could be round so that the line or point contact is produced in the area of the corners of the square shaft. The projection portion might be an integral part of the shaft rather than a projection. Instead of one reference surface per structural unit, two reference surface can be provided running at an angle to one another, in the shape of an arrow. This simultaneously gives rise to lateral centering of the structural elements relative to one another.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof, limited solely by the appended claims.

We claim:

1. An assembly comprising:
   a first structural member having a polygonal and slightly conical recess along a longitudinal centerline thereof, said recess having a planar contact surface disposed in spaced relation from said centerline and a surface diametrically opposed to said planar contact surface having at least a contact point; and
   a second structural member having a projecting portion along a longitudinal centerline thereof, insertable in said recess to align said members along this longitudinal centerline, said opposite surface of said recess being dimensioned such that said projecting portion overlaps said opposite surface, said projecting portion being cylindrical with a flattened surface thereon, said flattened surface being engageable with the planar contact surface of said first structural member, and said projecting portion having a contact point engageable with the contact point of said first structural member when said projecting member is received within said recess whereby upon insertion of said projecting portion into said recess said members will be prevented from displacing angularly relative to each other about said aligned centerlines.

2. An assembly according to claim 1 wherein said recess of said first structural element is rectangular.

3. An assembly according to claim 1 wherein said recess and said projecting portion contact each other at one or more lines of contact.

4. An assembly according to claim 1 wherein said first structural member is made of a flat material, said recess being produced by punching out to produce a slightly conical recess.

5. An assembly according to claim 4 wherein the direction of said punching being toward said second structural member.

6. An assembly according to claim 1 further comprising one or more planar contact surfaces being disposed on each of said structural members.

7. An assembly according to claim 6 wherein said one or more surfaces are at an angle to one another and adjacent to one another.

8. An assembly according to claim 1 wherein said recess includes one or more protuberance, said contact point of said recess being disposed on said protuberance.

9. An assembly according to claim 8 wherein said protuberance is produced when punching out the material surfaces that enclose the recess.

10. An assembly according to claim 1 wherein said projecting portion member includes protuberances located along the circumference thereof, said contact points being disposed on said protuberances contacting said recess.

* * * * *